United States Patent
Kobayashi (10) Patent No.: US 11,588,985 B2
(45) Date of Patent: Feb. 21, 2023

(54) ELECTRONIC APPARATUS AND CONTROL METHOD THEREOF

(71) Applicant: CANON KABUSHIKI KAISHA, Tokyo (JP)

(72) Inventor: Takashi Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/721,526

(22) Filed: Apr. 15, 2022

(65) Prior Publication Data

US 2022/0353405 A1 Nov. 3, 2022

(30) Foreign Application Priority Data

Apr. 28, 2021 (JP) .............................. JP2021-076559

(51) Int. Cl.
 *H04N 5/235* (2006.01)
 *H04N 5/243* (2006.01)

(52) U.S. Cl.
 CPC ........... *H04N 5/2357* (2013.01); *H04N 5/243* (2013.01)

(58) Field of Classification Search
 CPC ............................ H04N 5/2357; H04N 5/243
 See application file for complete search history.

(56) References Cited

U.S. PATENT DOCUMENTS

2019/0289191 A1* 9/2019 Noda ............... H04N 5/232945
2020/0154031 A1* 5/2020 Haraguchi ........... H04N 5/3532

FOREIGN PATENT DOCUMENTS

JP          6225000 B2     11/2017
JP       2020-080512 A     5/2020

* cited by examiner

*Primary Examiner* — Nelson D. Hernández Hernández
(74) *Attorney, Agent, or Firm* — Cowan, Liebowitz & Latman, P.C.

(57) ABSTRACT

An electronic apparatus comprises an image sensor including a first pixel group and a second pixel group, and capable of actuating the pixel groups with the same or different shooting conditions; a controller that switches between a first actuation control of actuating the first and second pixel groups with the same shooting conditions and a second actuation control of actuating the first and second pixel groups with different shooting conditions; a detector that detects flicker based on a signal read out from the image sensor; and a determination unit that determines whether or not the detector can detect flicker based on a signal read out from the image sensor by the second actuation control. If the determination unit determines affirmative, the controller controls to actuate the second pixel group with the shooting conditions for flicker detection in the second actuation control.

15 Claims, 10 Drawing Sheets

|  |  |  |  |  |  |  |  |  |
|---|---|---|---|---|---|---|---|---|
| 1st RAW | R | G | R | G | R | G | R | G |
| 2nd RAW | G | B | G | B | G | B | G | B |
| 3rd RAW | R | G | R | G | R | G | R | G |
| 4th RAW | G | B | G | B | G | B | G | B |
| 5th RAW | R | G | R | G | R | G | R | G |
| 6th RAW | G | B | G | B | G | B | G | B |
| 7th RAW | R | G | R | G | R | G | R | G |
| 8th RAW | G | B | G | B | G | B | G | B |
| 9th RAW | R | G | R | G | R | G | R | G |
|  | ⋮ | ⋮ | ⋮ | ⋮ | ⋮ | ⋮ | ⋮ | ⋮ |
| n-2th RAW | G | B | G | B | G | B | G | B |
| n-1th RAW | R | G | R | G | R | G | R | G |
| nth RAW | G | B | G | B | G | B | G | B |

\ MOVING IMAGE SCAN
\ FLICKER DETECTION SCAN

FIG. 5

|  | MOVING IMAGE | FLICKER DETECTION IMAGE |
|---|---|---|
| DO SHOOTING CONDITIONS AFFECT IMAGE QUALITY? | AFFECT | NOT AFFECT |
| IS IT POSSIBLE TO SPECIFY 50 Hz OR 60 Hz? | POSSIBLE TO SPECIFY ONE OF 50 Hz AND 60 Hz | POSSIBLE TO SPECIFY BOTH |
| IS IT POSSIBLE TO REDUCE EFFECT OF FLICKER BY CHARGE ACCUMULATION PERIOD? | POSSIBLE | POSSIBLE |
| IS IT POSSIBLE TO REDUCE EFFECT OF FLICKER BY GAIN? | POSSIBLE | NOT POSSIBLE |
| DOES ENERGY CONSUMPTION INCREASE? | NOT INCREASE | INCREASE |

| | ACTUATION FOR FLICKER DETECTION | IMAGE TO BE USED FOR FLICKER DETECTION |
|---|---|---|
| IS POWER SUPPLIED FROM OUTSIDE? | 0.2-SEC. INTERVALS | FLICKER DETECTION IMAGES |
| REMAINING BATTERY: HIGH (50~100%) | 1-SEC. INTERVALS | FLICKER DETECTION IMAGES |
| REMAINING BATTERY: MIDDLE (10%~50%) | 10-SEC. INTERVALS | FLICKER DETECTION IMAGES AND MOVING IMAGE |
| REMAINING BATTERY: LOW (10% OR LESS) AND SECOND ACTUATION CONTROL IMPOSSIBLE | NOT PERFORM | MOVING IMAGE |

ELECTRONIC APPARATUS AND CONTROL METHOD THEREOF

BACKGROUND OF THE INVENTION

Field of the Invention

The present invention relates to an electronic apparatus capable of shooting an image and a control method thereof, and particularly to a technique for detecting flicker.

Description of the Related Art

When an image is shot with a digital camera, a mobile phone, a camcorder, or the like, the brightness may change within one image or between images shot continuously due to the influence of a light source in the shooting environment. If the light source is a lighting which uses a commercial power source, flicker, which is a phenomenon that the illumination light fluctuates periodically, occurs as the influence of the frequency of the commercial power source. When shooting under a light source that generates such flicker (hereinafter referred to as "flicker light source"), exposure nonuniformity and/or color nonuniformity may occur in one image, or exposure and color temperature may vary between a plurality of continuously shot images.

With respect to flicker that occurs in a case where the frequency of the power supply is 50 Hz, the flicker light source blinks at 100 Hz, so it is possible to avoid the influence of the flicker by controlling the charge accumulation period to be N/100 seconds (N is a natural number). Further, with respect to flicker that occurs in a case where the frequency of the power supply is 60 Hz, the flicker light source blinks at 120 Hz, so it is possible to avoid the influence of the flicker by controlling the charge accumulation period to be N/120 seconds. Therefore, it is possible to reduce the influence of flicker on the image quality if whether the power supply frequency is 50 Hz or 60 Hz can be specified.

Further, conventionally, there has been known a technique of analyzing a change in brightness of continuously captured images and specifying the frequency of flicker that is occurring. Japanese Patent No. 6225000 discloses a technique for detecting flicker by switching the shooting conditions such as the actuation cycle and exposure conditions of the image capturing apparatus from normal shooting conditions to shooting conditions suitable for flicker detection so that flicker can be detected satisfactorily. However, since the detection is performed by switching to the shooting conditions suitable for flicker detection from the normal shooting conditions, it is not possible to detect flicker during shooting a moving image or to detect flicker while displaying a live view image.

Japanese Patent Laid-Open No. 2020-80512 discloses a method for detecting the frequency of flicker occurring in a subject while displaying a live view image or shooting a moving image. In this method, second pixel rows are read out at a timing and cycle different from those of first pixel rows which are used for live view display or moving image shooting, and the image signal of the second pixel rows is used for analyzing the blinking of a light source. For example, an image signal can be obtained by setting the frame rate and the exposure period of the second pixel rows to shooting conditions that facilitate flicker detection.

For example, in a case where the frequency of flicker is 120 Hz, if the frame rate of a moving image is set to 60 fps, the frame rate synchronizes with the flicker of 120 Hz, and the influence of blinking does not change between frame images, so flicker cannot be detected from the image signal obtained from the first pixel rows. On the other hand, since the second pixel rows can be set to shooting conditions suitable for detecting flicker, by reading the image signal at 90 fps, for example, which does not synchronize with 100 Hz flicker nor 120 Hz flicker, flicker of either of the frequencies can be detected satisfactorily.

However, in recent years, the performance of the image sensor has improved, and there is an image sensor capable of reading out an image signal at very high speed. For example, it becomes possible to perform slow motion recording at 120 fps or more in moving image shooting, and to shoot and display a smooth image at 120 fps or 240 fps with little delay in live view display.

With such an image sensor, in a case of shooting a moving image at a frame rate faster than the frequency of flicker of 100 Hz or 120 Hz, the charge accumulation period of each frame image of the moving image cannot be set to N/100 seconds or N/120 seconds. Therefore, it is not possible to reduce the influence of flicker caused by the blinking of the light source by adjusting the charge accumulation period. As a result, as shown in Japanese Patent Laid-Open No. 2020-80512, although the occurrence or absence of flicker and the frequency of flicker can be detected by analyzing the change in the image signal obtained from the second pixel rows, it is not possible to reduce the flicker appeared in an image of the image signal obtained from the first pixel rows.

In addition, the method for detecting flicker in Japanese Patent Laid-Open No. 2020-80512 has a problem that the power consumption is large as compared with the method in Japanese Patent No. 6225000 and the method conventionally performed.

SUMMARY OF THE INVENTION

The present invention has been made in consideration of the above situation, and performs flicker detection depending on the purpose.

According to the present invention, provided is an electronic apparatus comprising: an image sensor having a plurality of pixels which are divided into a plurality of pixel groups including a first pixel group and a second pixel group, and capable of actuating each pixel group with shooting conditions independently set for each pixel group; and at least one processor and/or circuitry which functions as: a controller that switches between a first actuation control in which the first pixel group and the second pixel group are actuated with same shooting conditions and a second actuation control in which the first pixel group and the second pixel group are actuated with shooting conditions different from each other; a detector that detects flicker based on a signal read out from the image sensor; and a determination unit that determines whether or not the detector can detect flicker based on a signal read out from the image sensor by the second actuation control, wherein if the determination unit determines that it is possible to detect flicker based on the signal read out from the image sensor by the second actuation control, the controller controls to actuate the second pixel group with the shooting conditions for flicker detection in the second actuation control, and the detector detects flicker based on a detection signal read out from the second pixel group.

Further, according to the present invention, provided is a control method of an electronic apparatus equipped with an image sensor having a plurality of pixels which are divided into a plurality of pixel groups including a first pixel group and a second pixel group, and capable of actuating each pixel group with shooting conditions independently set for each pixel group, the method comprising: controlling to switch between a first actuation control in which the first pixel group and the second pixel group are actuated with same shooting conditions and a second actuation control in which the first pixel group and the second pixel group are actuated with shooting conditions different from each other; detecting flicker based on a signal read out from the image sensor; and determining whether or not it is possible to detect flicker based on a signal read out from the image sensor by the second actuation control, wherein if it is determined that it is possible to detect flicker based on the signal read out from the image sensor by the second actuation control, it is controlled so that the second pixel group is actuated with the shooting conditions for flicker detection in the second actuation control, and that flicker is detected based on a detection signal read out from the second pixel group.

Furthermore, according to the present invention, provided is a non-transitory computer-readable storage medium, the storage medium storing a program that is executable by the computer, wherein the program includes program code for causing the computer to function as an electronic apparatus equipped with an image sensor having a plurality of pixels which are divided into a plurality of pixel groups including a first pixel group and a second pixel group, and capable of actuating each pixel group with shooting conditions independently set for each pixel group, comprising: a controller that switches between a first actuation control in which the first pixel group and the second pixel group are actuated with same shooting conditions and a second actuation control in which the first pixel group and the second pixel group are actuated with shooting conditions different from each other; a detector that detects flicker based on a signal read out from the image sensor; and a determination unit that determines whether or not the detector can detect flicker based on a signal read out from the image sensor by the second actuation control, wherein if the determination unit determines that it is possible to detect flicker based on the signal read out from the image sensor by the second actuation control, the controller controls to actuate the second pixel group with the shooting conditions for flicker detection in the second actuation control, and the detector detects flicker based on a detection signal read out from the second pixel group.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

In this embodiment, a digital mirrorless camera will be described as an example. However, the present invention can be applied to various electronic devices as long as they have a live view image display function and a moving image shooting function, and can be applied to, for example, smartphones, camcorders, game machines with cameras, and the like.

Figure 1:
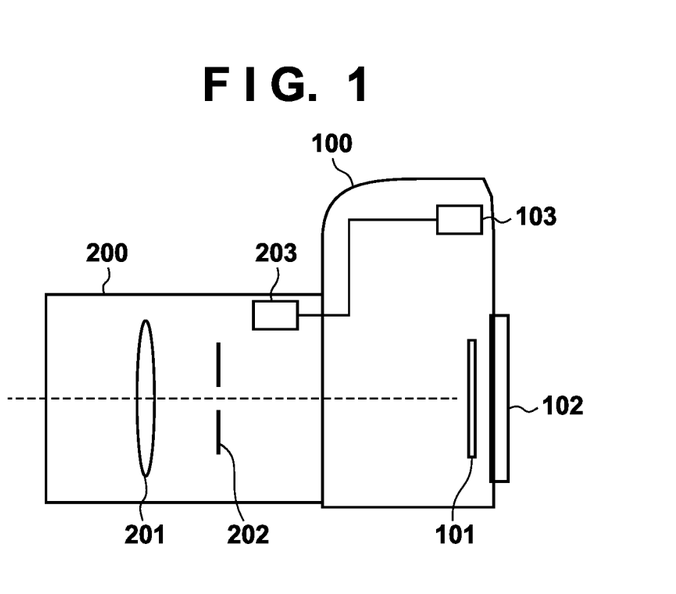
FIG. 1 is a diagram showing a schematic configuration of a digital mirrorless camera according to an embodiment of the present invention.

FIG. 1 is a diagram showing a schematic configuration of a digital mirrorless camera according to the present embodiment, and mainly includes a camera body 100 and an imaging lens 200. In the camera body 100, a reference numeral 101 denotes an image sensor such as a CCD or CMOS sensor including an infrared cut filter, a low-pass filter, and the like, and an optical image of a subject is formed on a light receiving surface of the image sensor 101 by the imaging lens 200. The image sensor 101 photoelectrically converts the optical image of the subject, and an image based on an obtained electric signal is displayed as a live view image or recorded as a shot image. The electric signal obtained from the image sensor 101 is also used for detecting flicker. The method of detecting flicker using this electric signal will be described later in detail. In the image sensor 101, the charge accumulation period can be controlled according to the shutter speed set as the shooting setting information.

A display unit 102 is composed of, for example, a TFT liquid crystal panel or the like. At the time of framing, an image acquired by the image sensor 101 and various shooting setting information are displayed in real time to realize a live view. In addition, the captured image can be displayed and confirmed by the user according to the user's operation.

Further, a touch panel may be provided on the display unit 102 and used as an operation member, and the touch panel detects a user's touch operation on an icon or the like displayed on the display unit 102, thereby a function associated with the displayed content on the display unit 102 at the touch position can be executed, A CPU 103 controls each part of the camera body 100. The CPU 103 also controls the image sensor 101 and the display unit 102.

Next, the imaging lens 200 will be explained.

A reference numeral 201 denotes a lens group including a focus lens, and the focus state can be adjusted by moving the focus lens. Although the lens group 201 is represented by one lens in FIG. 1, it is actually composed of a plurality of lenses. A reference numeral 202 denotes a diaphragm, which adjusts an amount of light to be passed into the camera. A reference numeral 203 denotes a CPU that controls each part of the imaging lens 200. In addition to controlling the lens group 201 and the diaphragm 202, the CPU 203 communicates with the CPU 103 in the camera body 100 to provide information such as a position of the focus lens and an aperture to the camera body 100.

Next, an actuation method of the image sensor 101 in the present embodiment will be described.

Figure 2:
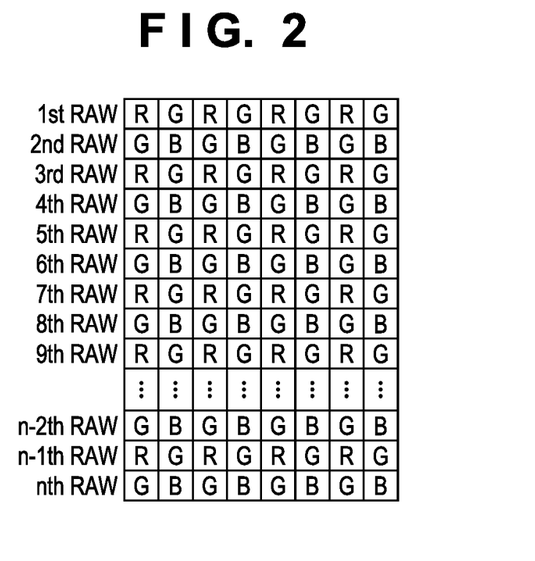
FIG. 2 is a diagram showing an example of a pixel arrangement in an image sensor according to the embodiment.

FIG. 2 is a diagram showing the pixel arrangement of the image sensor 101, and as an example, the pixel arrangement of the Bayer arrangement is shown. Further, the image sensor 101 of the present embodiment has a configuration that can be independently controlled in unit of row. Further, the image sensor 101 can be selectively actuated by a first actuation control in which all the pixels of the image sensor 101 are actuated under the same shooting conditions, or a second actuation control in which first pixel rows (first region) and second pixel rows (second region) are actuated using different shooting conditions. In the first actuation control, the image sensor 101 may be actuated by a reading method generally used conventionally, and the image sensor 101 may be controlled so that the signal is read out from all the pixels, or the signal is read out while performing thinning and/or adding. Specifically, the reading method may be changed according to the intended use of the read signal, the resolution and shooting mode set by a user, the standard of destination of the read signal, the power state of the camera body 100, and so forth.

Next, the second actuation control will be described with reference to FIGS. 3A and 3B.

Figure 3A:
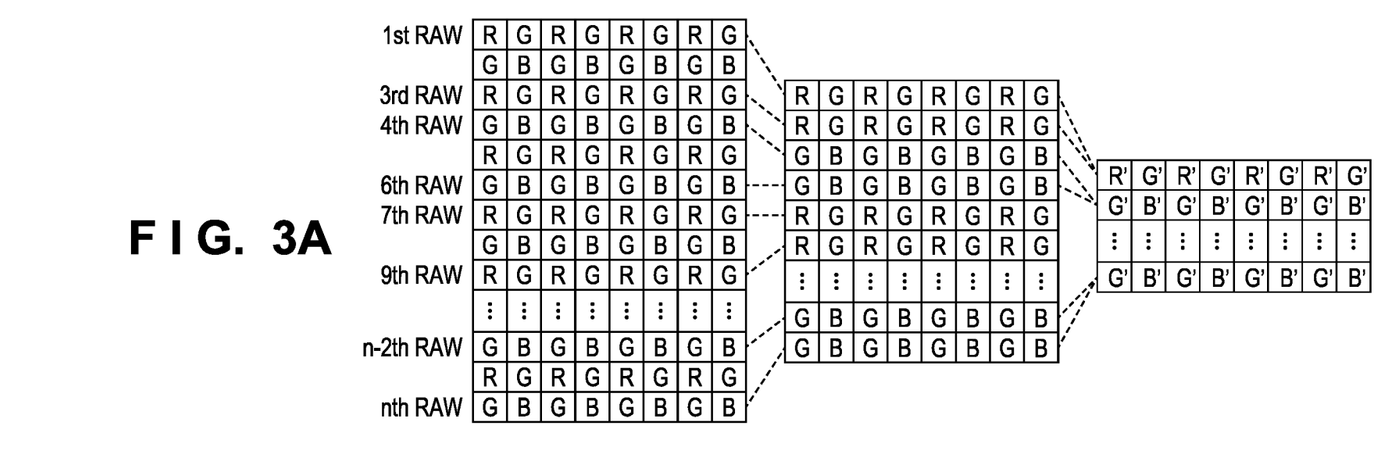
FIGS. 3A and 3B are diagrams for explaining generation of a moving image and a flicker detection image in terms of a pixel arrangement of the image sensor according to the embodiment.

FIG. 3A shows the concept of a method of reading out a signal from a first pixel group of the pixels arranged as shown in FIG. 2 and generating a moving image for recording or for display. Further, FIG. 3B shows a concept of a method of reading out a signal from a second pixel group of the pixels arranged as shown in FIG. 2 and generating an image to be used for detecting flicker (hereinafter, referred to as "flicker detection image" (detection signal)). In the present embodiment, the same readout control is repeated with three pixel rows as one control unit. First, of the first three rows, a signal is read out from the first and third rows as the first pixel group, and a signal is read out from the second row as the second pixel group. Then, of the next three rows, a signal is read out from the fourth and sixth rows as the first pixel group, and a signal is read out from the fifth row as the second pixel group.

When such control is repeated, a signal is read out from the first pixel group by ⅔ thinning out. As a result, as in the pixel arrangement shown in the center of FIG. 3A, the arrangement of colors of the readout signal in two consecutive rows are the same. In the following description, this readout scan is referred to as "moving image scan". As shown in the pixel arrangement on the right side of FIG. 3A, if the signal of the two consecutive rows read by the moving image scan is added in the vertical direction, an R' signal is generated from the R signal of two consecutive pixels in the vertical direction, a G' signal is generated from the G signal of two consecutive pixels, and a B' signal is generated from the B signal of two consecutive pixels. Since the moving image consisting of the R', G', and B' signals generated in this way has the Bayer arrangement, it is possible to apply the same image processing used for a normal image to the generated moving image.

Figure 3B:
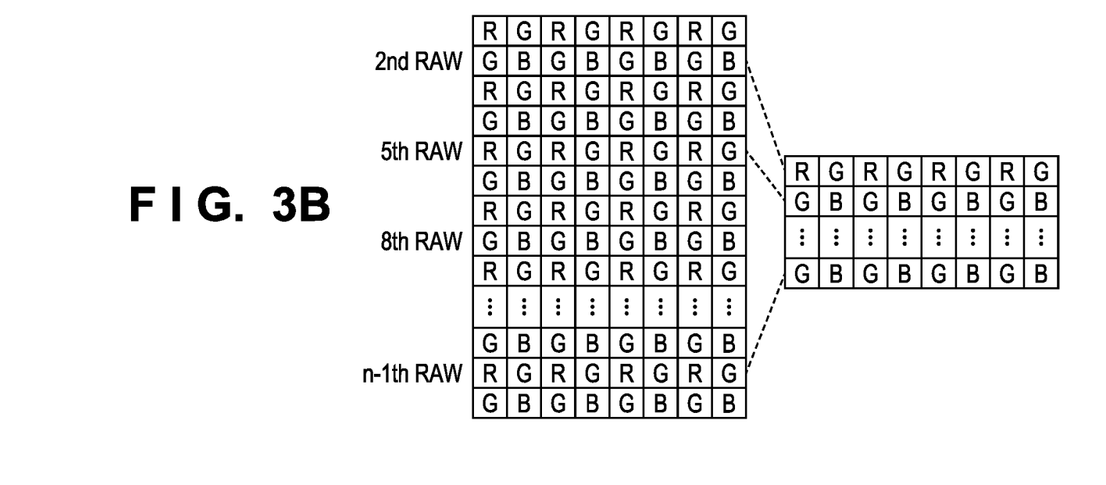

Further, since a signal is read out from the second pixel group by ⅓ thinning out, a flicker detection image having the Bayer arrangement as shown on the right of FIG. 3B can be obtained. In the following description, this readout scan is referred to as "flicker detection scan".

Although only the pixel arrangement corresponding to an X-Y addressing method has been described here, the present invention is not limited to this. As long as the image sensor can be controlled independently in unit of row, it is possible to perform the second actuation control in either the global shutter method typically adapted by a CCD sensor or the rolling shutter method typically adapted by a CMOS sensor.

Figure 4:
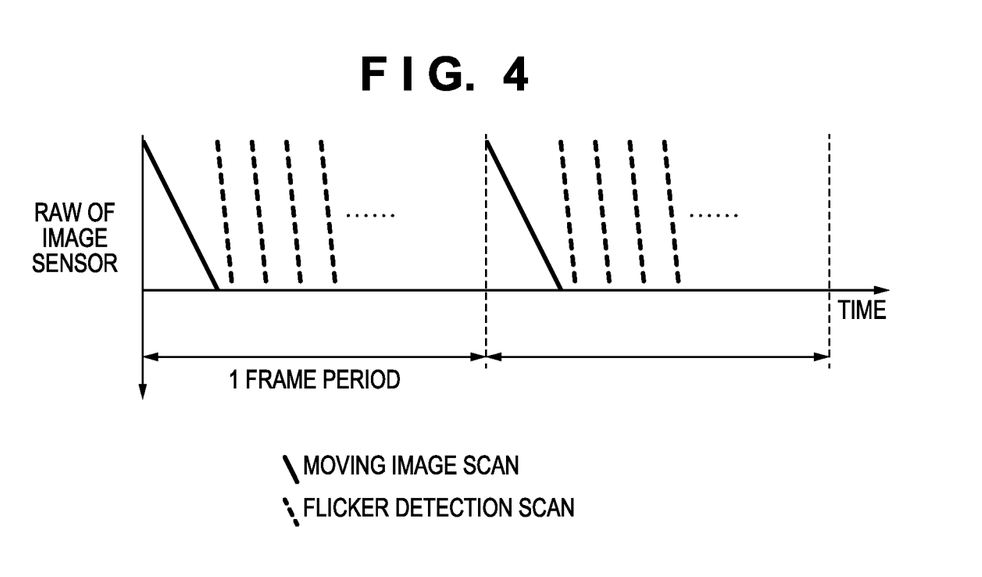
FIG. 4 is a timing diagram of a moving image scan and a flicker detection scan in second actuation control according to an embodiment.

FIG. 4 is a diagram showing an example of timings of performing the moving image scan and the flicker detection scan, where the horizontal axis shows time and the vertical axis shows the vertical position (row) of the image sensor 101. Further, the diagonal solid lines indicate timings of performing the moving image scan, and the diagonal broken lines indicate timings of performing the flicker detection scan. In the example shown in FIG. 4, during one frame period of the moving image, the moving image scan is performed once first, and then the flicker detection scan is performed a plurality of times. The flicker detection scan does not necessarily have to be performed in each frame, and may be performed, for example, every plurality of frames. The number of times the flicker detection scan can be performed in each frame depends on the shooting conditions, the performance of the image sensor 101, and the like, but the moving image scan is performed once in each frame period. Further, the moving image scan may not necessarily be performed first, and may be performed, for example, after the flicker detection scan is performed.

Figure 5:
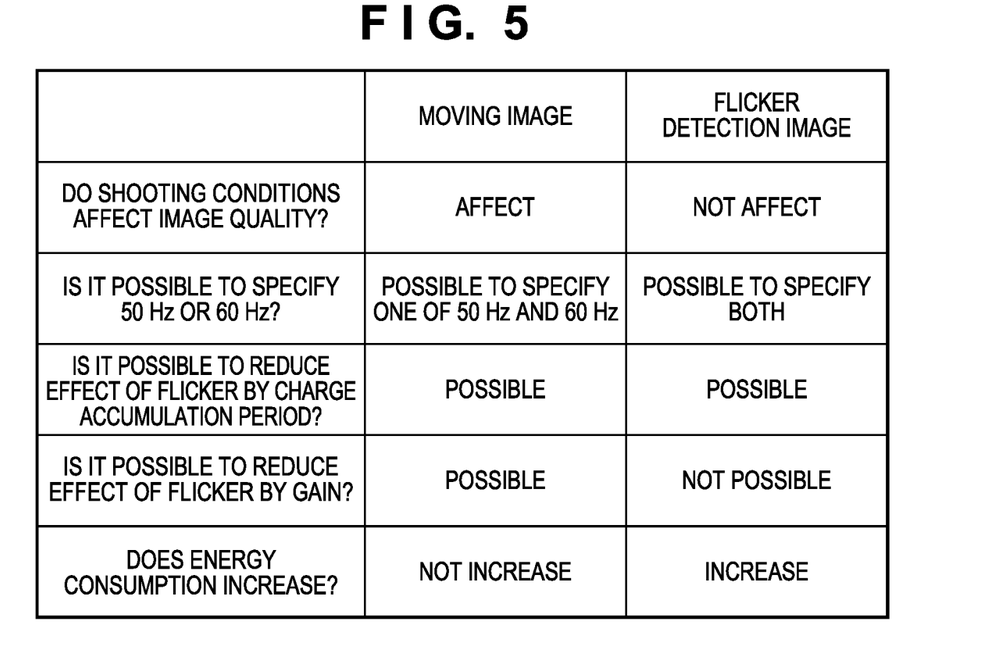
FIG. 5 is a diagram showing features of flicker detection using a moving image and of flicker detection using a flicker detection image according to the embodiment.

Next, the feature of the flicker detection method using the flicker detection images obtained by the flicker detection scan and the feature of conventional flicker detection method using the moving image will be described with reference to a table of FIG. 5.

First, regarding "Do shooting conditions affect image quality?", the flicker detection scan can be performed using shooting conditions, such as an exposure period different from the moving image scan, which facilitate the flicker detection. The moving image scan must be performed according to the standards of display devices and recording methods, camera settings, user settings, etc. in order to obtain a moving image. By contrast, flicker detection images are neither displayed nor recorded, so the flicker detection scan can be performed under free shooting conditions.

Next, regarding "Is it possible to specify 50 Hz or 60 Hz?", it is as follows. As for a moving image, there are two mains video standards, one is a video standard by NTSC (National Television System Committee) and the other is PAL (Phase Alternating Line) standard. The standard of transmission rate in NTSC is 29.97 frames per second (≈30 fps), and the standard of transmission rate in PAL is 25 frames per second, which are synchronized with the blinking of 120 Hz and 100 Hz, respectively. As a result, in the case of flicker detection using a moving image, the blinking of either of 100 Hz or 120 Hz cannot be detected.

On the other hand, in the flicker detection scan, the shooting conditions can be freely determined as described above. Therefore, by actuating the image sensor 101 at 90 fps, 180 fps, or the like, which does not synchronize with the blinking of 120 Hz nor 100 Hz, it is possible to detect both 100 Hz flicker and 120 Hz flicker using the obtained flicker detection images.

Next, a flicker reduction method will be described. As described above, it is known that by setting the charge accumulation period to an integral multiple of the flicker cycle, an image in which the influence of flicker is suppressed can be taken. That is, regardless of whether flicker is detected using the moving image or the flicker detection images, it is possible to reduce the influence of flicker by setting the charge accumulation period of the moving image to an integral multiple of the detected flicker cycle according to the detected flicker frequency.

However, if the frame rate is high, it may not be possible to set the charge accumulation period to an integer multiple of the flicker cycle. For example, when blinking at 100 Hz is detected while shooting a moving image at 120 fps, $\frac{1}{100}$ second is longer than the period of 120 fps, so it is not possible to control the charge accumulation period of each frame to an integer multiple of the flicker cycle that can reduce the influence of the flicker. This also applies to higher speed photography such as 200 fps and 240 fps. In such a case, the influence of flicker can be corrected by applying an image correction (gain) that cancels the influence of the flicker to the moving image instead of controlling the exposure period. The method of image correction to be applied to an image taken by using the rolling shutter differs from that to be applied to an image taken by using the global shutter.

Figure 6:
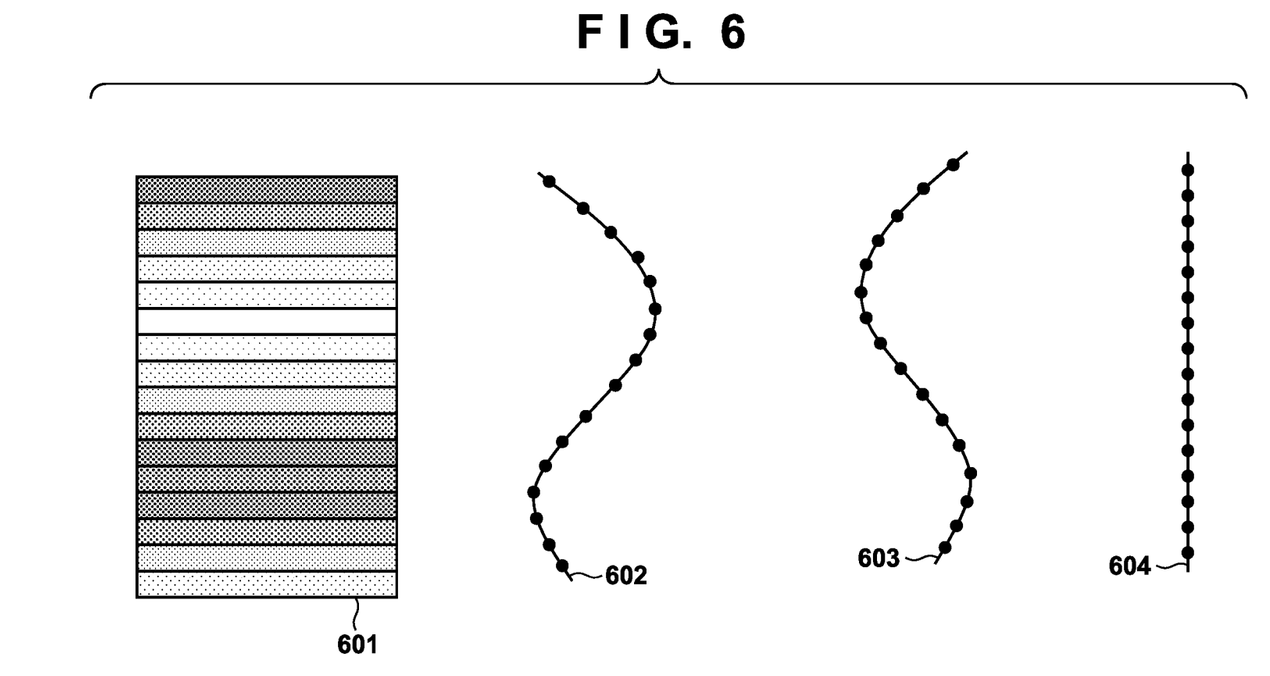
FIG. 6 is a conceptual diagram showing a method for reducing influence of flicker in a case where the image sensor is actuated by a rolling shutter method according to the embodiment.

FIG. 6 is a conceptual diagram showing a flicker reduction method by image processing for an image shot by using the rolling shutter. With the rolling shutter, since the charge accumulation timing is different row by row, the received amount of light differs row by row due to the blinking of the light source. As a result, the brightness fluctuates in the vertical direction of the image as shown by 601. Flicker can be corrected (604) by analyzing this change in luminance (602) and performing image processing in which each row is multiplied by a digital gain (603) that is the reciprocal of the change in luminance in the vertical direction.

Figure 7:
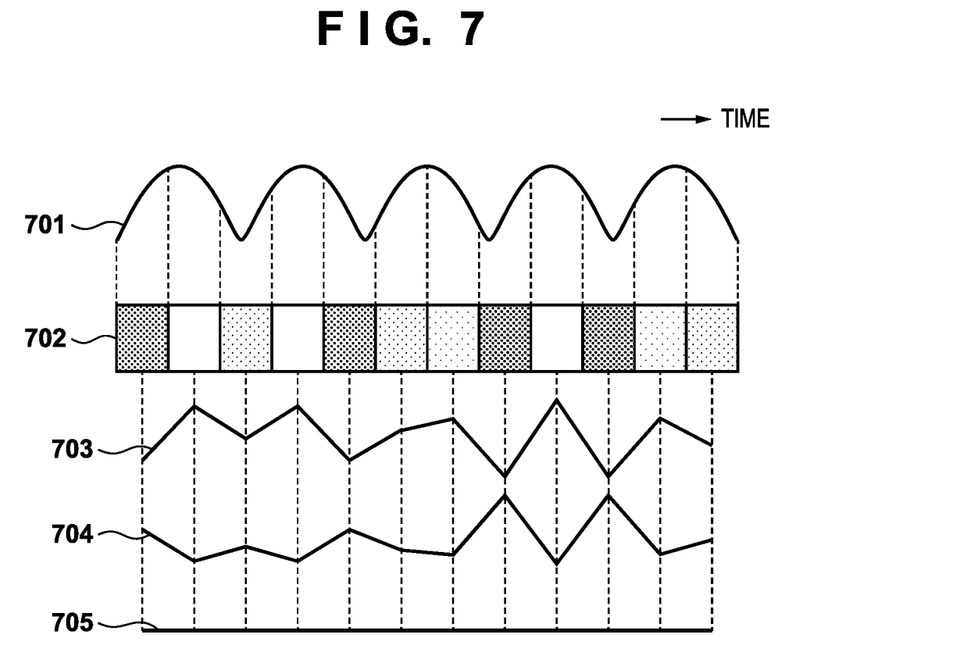
FIG. 7 is a conceptual diagram showing a method for reducing influence of flicker in a case where the image sensor is actuated by a global shutter method according to the embodiment.

FIG. 7 shows a conceptual diagram of a method for correcting a moving image shot by using the global shutter. In the global shutter method, charge accumulation starts and completes at the same timing in all rows of each frame image, so that there is no change in brightness due to flicker in each frame image. However, when the brightness of a plurality of images shot continuously in the time direction is analyzed, since the received amount of light differs between frame images depending on the blinking of the light source (701), luminance differs between frame images (702). Therefore, the change in luminance between the frame images is analyzed (703), and a correction gain (704) that cancels the influence of blinking is applied to each frame image to make the brightness between the frame images uniform (705). By doing so, it is possible to correct flicker when frame images are viewed continuously.

Here, in a case where flicker is detected by using the flicker detection images, the influence of flicker cannot be reduced by using the gain. This is because the flicker detection images are shot under different shooting conditions from the moving image, and the influence of the blinking of the light source on the flicker detection images is different from that on the moving image. The number and density of stripes differ between the flicker detection images and the moving image in a case where the rolling shutter is used, and the period of luminance change and the amplitude appearing in the image differ between the flicker detection images and the moving image in a case where the global shutter is used. Therefore, even if the occurrence or absence of blinking at 100 Hz or 120 Hz can be detected from the flicker detection images, gains (image processing coefficient) to be applied to the moving image cannot be calculated.

Lastly, the power consumption is as follows. That is, when comparing the power consumptions with and without the flicker detection scan, the power consumption of the image sensor 101 increases when the flicker detection scan is performed as compared with the case where the flicker detection scan is not performed. Further, when only the first actuation control or the moving image scan is performed, the power consumption does not change as compared with the conventional case. Therefore, when the flicker detection scan is performed, the consuming speed of battery increases and the number of images that can be shot is reduced as compared with the case where the flicker detection scan is not performed.

Figure 8:
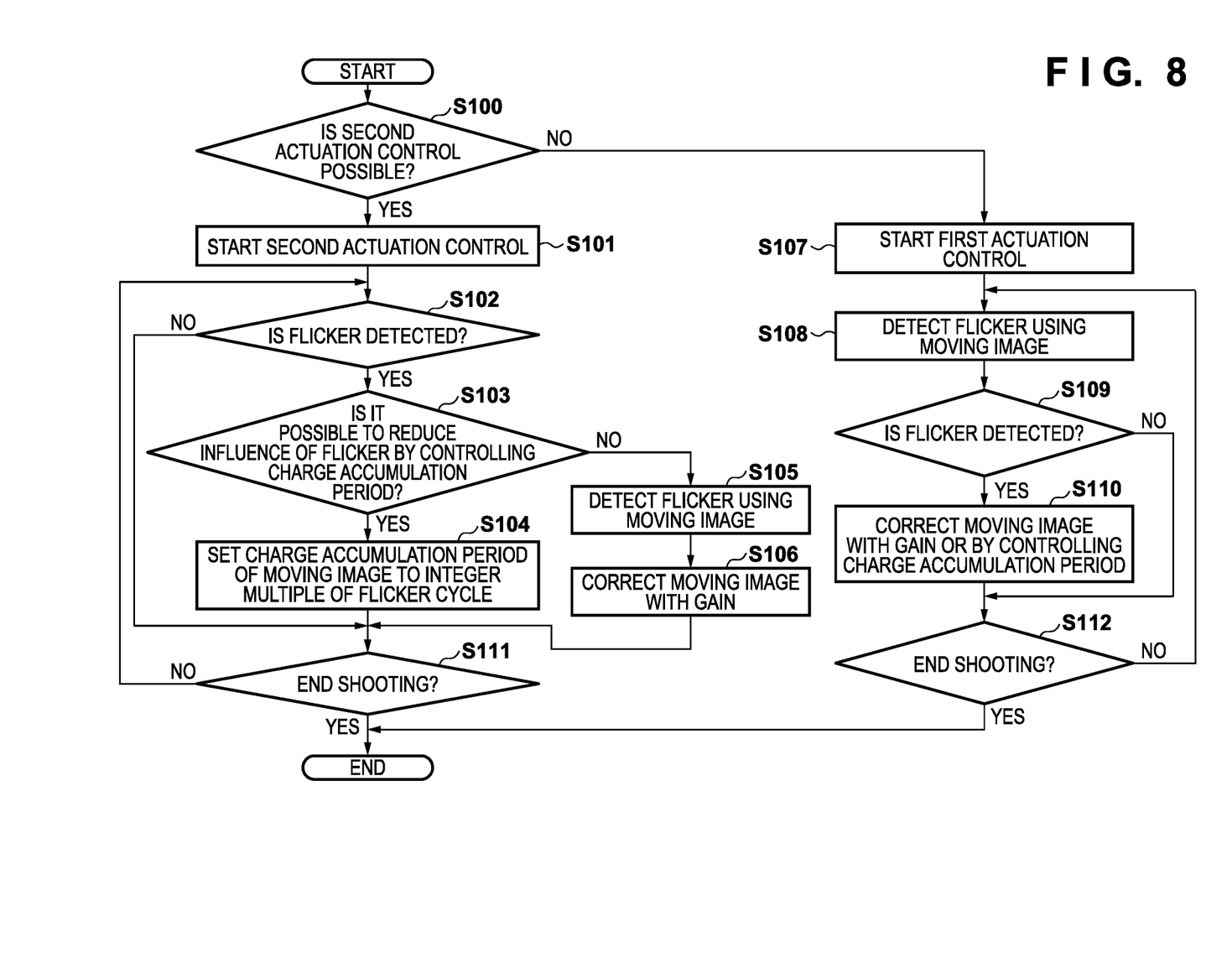
FIG. 8 is a flowchart showing flicker detection control and a countermeasure method for flicker according to the first embodiment.

In consideration of the features of the flicker detection using the moving image and the flicker detection using the flicker detection images as described above, in the first embodiment, the control shown in FIG. 8 is performed based on capability of flicker reduction. FIG. 8 is a flowchart showing flicker detection and countermeasures against flicker in a still image live view mode or a moving image mode. The control shown in FIG. 8 is started when the still image live view mode or the moving image mode is instructed.

First, in step S100, it is determined whether or not the second actuation control is possible. As the second actuation control has been described with reference to FIGS. 2 to 4, the second pixel group that is not used for generating a moving image is used for generating a flicker detection image. However, since the second pixel group cannot be secured in the mode of reading out all pixels such as in a 4K moving image mode that requires high resolution, for example, the second actuation control cannot be performed. In such a case, the first actuation control is started in step S107, flicker is detected in step S108 using the obtained moving image, and the occurrence or absence of flicker is determined in step S109. Here, the absence of flicker includes both the case where the flicker is actually absent and the case where the flicker cannot be detected even if the flicker is occurring as described above.

If the flicker is detected, the process proceeds to step S110 to reduce the influence of flicker in the moving image by changing the charge accumulation period or by applying a gain. On the other hand, if flicker is not detected, the process proceeds to step S112 to determine whether or not to end shooting. If the shooting is not ended, the process returns to step S108, the above processes are repeated for the next input image, and if the shooting is ended, the processing is ended.

On the other hand, if it is determined that the second actuation control is possible in step S100, the second actuation control is started in step S101. Then, the flicker detection is performed using the flicker detection images acquired by the second actuation control, and the occurrence or absence of flicker is determined in step S102. If flicker is not detected, the process proceeds to step S111.

If flicker is detected in step S102, the process proceeds to step S103, and it is determined whether the influence of the flicker can be reduced by controlling the charge accumulation period. Whether or not the influence of the flicker can be reduced by controlling the charge accumulation period is determined based on the frame rate of the moving image scan and the frequency of the detected flicker. For example, if the frame rate of the moving image scan is 120 fps and flicker of 120 Hz is detected, the influence of the flicker can be reduced by setting the charge accumulation period to $\frac{1}{120}$ second. On the other hand, if 100 Hz flicker is detected when the frame rate of the moving image scan is 120 fps, since the charge accumulation period cannot be set to $\frac{1}{100}$ second, it is determined that the influence of the flicker cannot be reduced. That is, the cycle of flicker and the frame rate of moving image scan are compared, and if the cycle of flicker is equal to or less than the frame rate, it is determined that the influence of flicker can be reduced by controlling the charge accumulation period. If YES in step S103, then in step S104, the charge accumulation period of the moving image scan is set to the charge accumulation period with which the influence of flicker can be reduced (an integral multiple of the flicker cycle), and the process proceeds to step S111.

On the other hand, if it is determined in step S103 that the influence of flicker cannot be reduced by controlling the charge accumulation period, flicker detection is performed by analyzing the brightness of the moving image in step S105, and the gain value to be applied to the moving image in image processing is calculated. Then, in step S106, the influence of flicker on the moving image is corrected by image processing using the calculated gain value, and the process proceeds to step S111.

In step S111, it is determined whether or not to end the shooting. If the shooting is not ended, the process returns to step S102, and the flicker detection is performed using the next input flicker detection image. If the shooting is ended, the processing is ended.

As described above, according to the first embodiment, when the image sensor has a configuration capable of acquiring a flicker detection image from a part of a pixel area of the image sensor, the flicker detection method is changed according to the flicker reduction method. This makes it possible to obtain a moving image less affected by flicker under various shooting conditions.

Second Embodiment

Next, a second embodiment of the present invention will be described. Since the configuration of the apparatus in the second embodiment is the same as that in the first embodiment, the description thereof will be omitted.

In the second embodiment, the control of switching the actuation control method from the viewpoint of the power consumption described with reference to FIG. 5 will be described with reference to a flowchart of FIG. 9.

First, in step S200, it is determined whether or not the second actuation control is possible. For example, if the settings related to the readout operation of a moving image such as a 4K moving image mode are set, it is not possible to perform the second actuation control that includes the flicker detection scan. Further, since the second actuation control accompanied by the flicker detection scan consumes a large amount of power, in the second embodiment, the second actuation control is not performed in the case where the camera settings that prioritize the power saving such as the power saving priority setting are set.

If the second actuation control cannot be performed, the process proceeds to step S211 to start the first actuation control. As mentioned above, in the first actuation control, all the pixels of the image sensor 101 are actuated under the same shooting conditions, but it is not necessary to read out a signal from all the pixels, and thinning out reading and additive reading may be performed according to the required resolution. In the next step S212, flicker detection is performed using the moving image obtained by the first actuation control, and the process proceeds to step S213.

On the other hand, in a case where the second actuation control is possible, the power state of the camera is checked in steps S202 and S203. If power is supplied from the outside via a power cable, USB cable, etc. (YES in step S202), the problem of power consumption due to the second actuation control does not occur, so the process proceeds to step S205 to start the second actuation control. Here, for example, the flicker detection scan is performed at 0.2-second intervals. Then, the process proceeds to step S208.

On the other hand, if power is not suppled from the outside and the remaining battery level is equal to or less than a predetermined threshold value Tb1 (for example, 10%) (YES in step S203), it is considered that not much power is left and the process proceeds to step S211 where the first actuation control is started. Then, in step S212, flicker detection is performed using the moving image obtained by the first actuation control, and the process proceeds to step S213.

In step S213, it is determined whether or not to end the shooting. If the shooting is not ended, the process returns to step S212, flicker is detected for the next input image, and if the shooting is ended, the processing is ended.

Further, in step S203, even if power is not supplied from the outside, if the remaining battery level is higher than the predetermined threshold value Tb1 (for example, 10%) (NO in step S203), it does not mean that the remaining power is very low, and the process proceeds to step S204 to further determine the remaining battery level. For example, if the remaining battery level is greater than a predetermined threshold Tb2 (for example, 50%) and the power state is sufficient (in a range between 50 to 100%), the process proceeds to step S206 and the second actuation control is started. Here, for example, the flicker detection scan is performed at 1-second intervals, and the process proceeds to step S208.

In step S208, flicker is detected using only the flicker detection images, and the process proceeds to step S210.

On the other hand, if the remaining battery level is equal to or less than the predetermined threshold value Tb2 (range of 10 to 50%) (YES in step S204), the power state is not low but the power consumption is desired to be suppressed, so the process proceeds to step S207, and the second actuation control is started. Here, for example, the flicker detection scan is performed at 10-second intervals. Then, the process proceeds to step S209. In step S209, flicker detection is performed using the flicker detection images at the timing when the flicker detection images are present, and using the moving image at the timing when no flicker detection image is present, and the process proceeds to step S210.

In step S210, it is determined whether or not to end the shooting. If the shooting is not ended, the process returns to step S202, and the above-mentioned processes are repeated. If the shooting is ended, the processing is ended.

Figure 9:
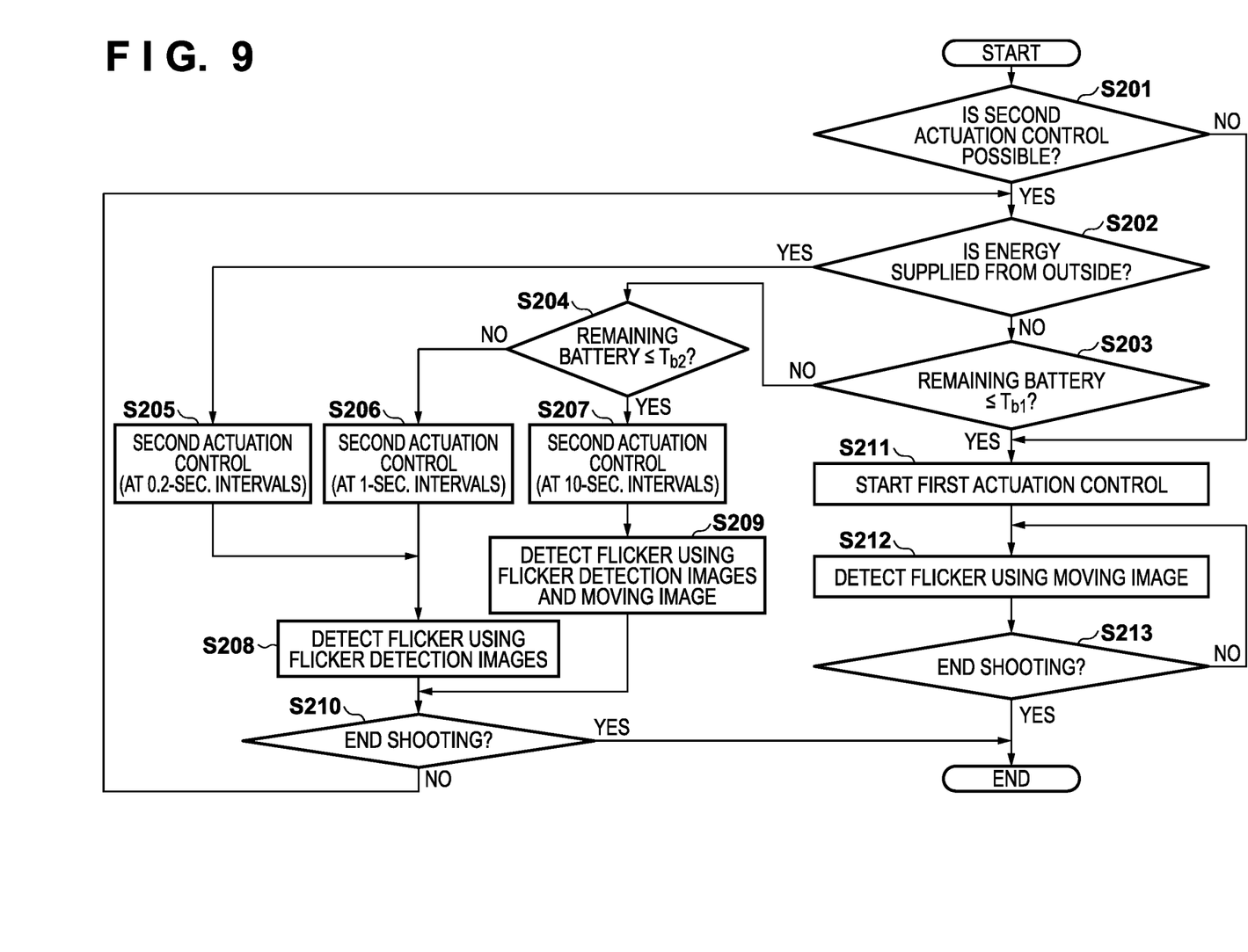
FIG. 9 is a flowchart showing flicker detection control according to the second embodiment.
Figure 10:
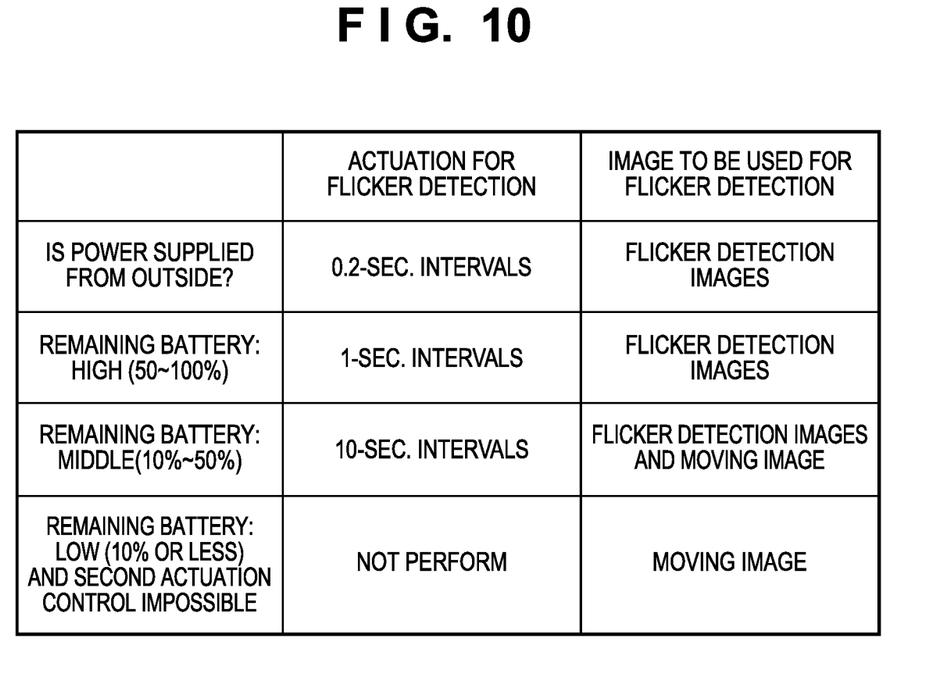
FIG. 10 is a diagram summarizing the processes shown in FIG. 9.

FIG. 10 is a summary of the processes of FIG. 9 described above. When power is being supplied from the outside, there is no need to worry about the remaining battery, so the second actuation control is performed and the flicker detection scan is performed at first intervals (for example, 0.2-second intervals) whose frequency is high. Then, flicker detection is performed using only the flicker detection images. On the other hand, even if power is not supplied from the outside, when the remaining battery is sufficient (for example, 50% to 100%), the second actuation control is performed and the flicker detection scan is performed at second intervals (for example, at 1-second intervals), which is less frequent than in the state where the power is supplied from the outside. Then, flicker detection is performed using only the flicker detection images.

In addition, if the power is not supplied from the outside and the remaining battery power is low (10% to 50%), priority is given to suppressing power consumption, and the interval of the flicker detection scan is further lengthened to a third interval (for example, 10-second intervals) in the second actuation control. Then, when the flicker detection images are generated, the flicker detection is performed using the flicker detection images, and while no flicker detection image is generated, the flicker detection is performed using the moving image.

As described above with reference to FIG. 5, only flicker of either 50 Hz or 60 Hz can be detected using a moving image. Therefore, in a case where a flicker detection image cannot be acquired, there is always a flicker having a frequency that cannot be detected. In consideration of the above, the flicker detection scan is performed periodically although the interval is long, and between the flicker detection scans, flicker is constantly detected using a moving image, so that a well-balanced flicker detection that power consumption is suppressed and detection accuracy is not significantly reduced can be realized.

In addition, if power is not supplied from the outside and the remaining battery level is extremely low (10% or less), or when the second actuation control is not possible, the highest priority is given to reducing power consumption, the second actuation control is not performed, and flicker detection is performed using a moving image obtained by normal shooting.

In the second embodiment, an example in which the flicker detection scan is periodically performed at regular time intervals is shown, but it is not always necessary to perform the flicker detection scan periodically. For example, control may be performed such that a change in the subject is monitored in a moving image and the flicker detection scan is restarted if the change in the subject occurs, or a change in the flicker level is monitored based on the flicker detection result using the moving image and the flicker detection scan is restarted if the change in flicker level is detected. By constantly or conditionally performing the flicker detection scan according to the conditions while the flicker detection is being carried out by using the moving image, it is possible to realize substantially good flicker detection performance while suppressing the power consumption.

Further, in the present embodiment, remaining battery levels of 10%, 50%, etc. are given as examples of the threshold values for switching the flicker detection control, but other percentages may be used. Further, the percentages may be changed according to the camera settings such as, for example, the moving image mode and the still image mode.

As described above, according to the second embodiment, the flicker detection method is changed according to the state of power supply. This makes it possible to perform good flicker detection according to the state of power supply.

It should be noted that, according to the detected flicker cycle, the influence of the flicker can be reduced as described in step S103 and subsequent steps of FIG. 8 of the first embodiment.

<Modification>

In the first and second embodiments, the processing in which the flicker detection scan is performed during moving image shooting has been described, however, flicker detection may be performed while the camera is blacked out. For example, flicker detection may be performed during blackout immediately after the power is turned on, or during blackout during still image shooting performed in response to pressing of the release button. Since the captured image is not displayed on the display unit 102 in flicker detection during blackout, the flicker detection may be performed using a moving image or flicker detection images, or a flicker detection using another method may be performed.

Figure 11A:
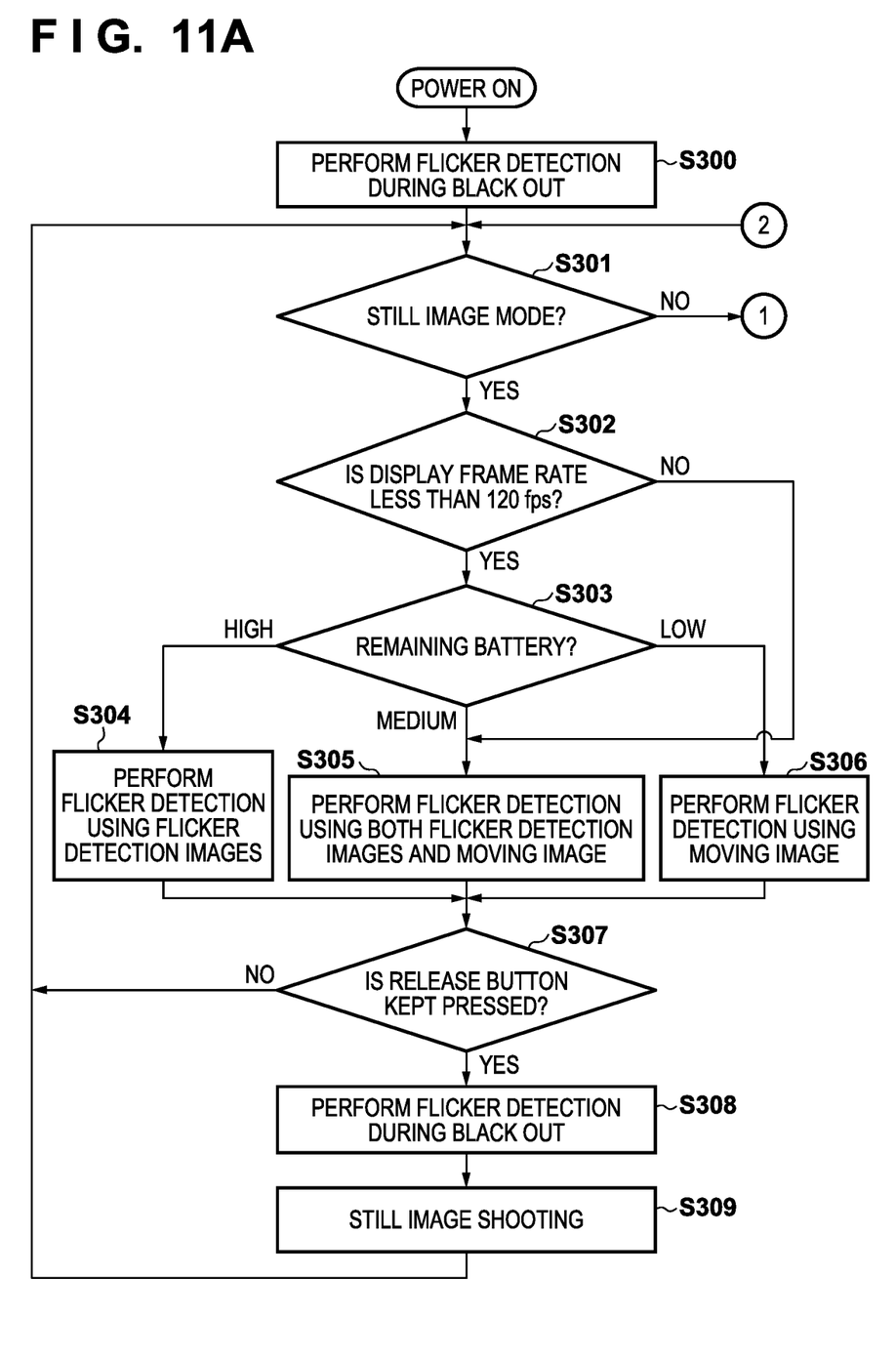
FIGS. 11A and 11B are a flowchart showing flicker detection control according to a modification.
Figure 11B:
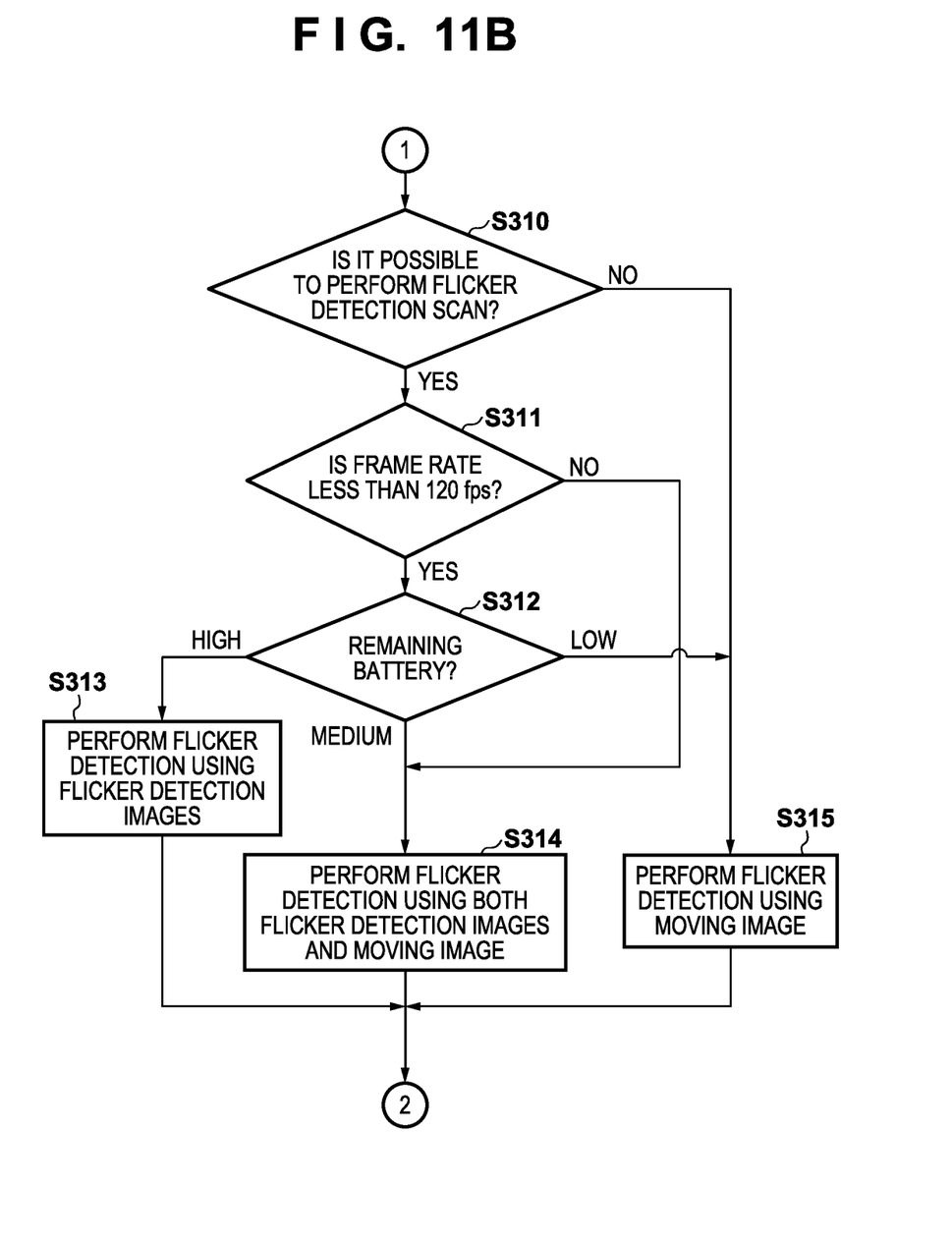

In this modification, including such a case, a flow of processing of the entire flicker detection control from the power-on to the transition of the state of camera will be described with reference to a flowchart shown in FIGS. 11A and 11B.

First, in step S300, flicker detection is performed during blackout at the time of power-on. Subsequently, in step S301, it is determined whether the mode at the time of power-on is the still image mode or the moving image mode. In a case of the still image mode, the frame rate of the live view display is determined in step S302, and if the frame rate is 120 fps or more, the second actuation control of performing the above-mentioned flicker detection scan at third intervals is performed in step S305, and flicker detection is performed using both the moving image and the flicker detection images, and the occurrence or absence of flicker is determined.

If the frame rate of the live view display is less than 120 fps in step S302, the power state is determined in step S303. If power is supplied from the outside or if the remaining battery is sufficient, the process proceed to step S304 where the second actuation control with the above-mentioned flicker detection scan at the first intervals or the second intervals is performed, and flicker detection is performed using only flicker detection images. Further, if power is not supplied from the outside but there is enough battery left, the second actuation control with the above-mentioned flicker detection scan at the third intervals is performed in step S305, and the flicker detection is performed using both flicker detection images and a moving image. If power is not supplied from the outside and there is not much battery left, the first actuation control is performed in step S306, and flicker detection is performed using only a moving image.

In a case where a still image shooting instruction is received during the live view display in step S307, flicker detection is performed at the timing of switching from the live view display to the still image shooting in step S308, and then the still image shooting is performed in step S309. After finishing the still image shooting, the process returns to step S301 again to determine the still image mode or the moving image mode.

Next, a case where the moving image mode is determined in step S301 will be described. In the moving image mode, flicker detection scan cannot be performed in an actuation mode such as a 4K moving image in which thinning readout cannot be performed. Therefore, it is determined in step S310 whether or not the flicker detection scan is possible. If the flicker detection scan is not possible, the first actuation control is performed in step S315, and flicker detection is performed using only a moving image.

In a case where it is determined in step S310 that the flicker detection scan is possible, then in step S311, it is determined whether the frame rate of the live view display is less than 120 fps. If it is determined that the frame rate is 120 fps or more, the second actuation control in which the above-mentioned flicker detection scan is performed at the third intervals is started in step S314, and flicker detection is performed using both flicker detection images and a moving image.

If the frame rate is less than 120 fps, the power state is determined in step S312. As in the case of the still image live view display, if the power is supplied from the outside or the remaining battery is sufficient, the process proceeds to step S313, and the second actuation control in which the above-mentioned flicker detection scan is performed at the first intervals or the second intervals is performed, and flicker detection is performed using only flicker detection images. Further, if power is not supplied from the outside but there is a certain amount of battery left, the second actuation control in which the above-mentioned flicker detection scan is performed at the third intervals is started in step S314, and the flicker detection is performed using both flicker detection images and a moving image. If power is not supplied from the outside and there is not much battery left, the first actuation control is performed in step S315, and flicker detection is performed using only a moving image.

While performing the flicker detection process, the process returns to step S301 again to check the still image mode or the moving image mode, and the flicker detection process is continued.

OTHER EMBODIMENTS

The present invention may be applied to a system composed of a plurality of devices or an apparatus composed of one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-076559, filed Apr. 28, 2021 which is hereby incorporated by reference herein in its entirety.

What is claimed is:

1. An electronic apparatus comprising:
an image sensor having a plurality of pixels which are divided into a plurality of pixel groups including a first pixel group and a second pixel group, and capable of actuating each pixel group with shooting conditions independently set for each pixel group; and
at least one processor and/or circuitry which functions as:
a controller that switches between a first actuation control in which the first pixel group and the second pixel group are actuated with same shooting conditions and a second actuation control in which the first pixel group and the second pixel group are actuated with shooting conditions different from each other;
a detector that detects flicker based on a signal read out from the image sensor; and
a determination unit that determines whether or not the detector can detect flicker based on a signal read out from the image sensor by the second actuation control,
wherein if the determination unit determines that it is possible to detect flicker based on the signal read out from the image sensor by the second actuation control, the controller controls to actuate the second pixel group with the shooting conditions for flicker detection in the second actuation control, and the detector detects flicker based on a detection signal read out from the second pixel group.

2. The electronic apparatus according to claim 1, wherein, if the determination unit determines that it is not possible to detect flicker based on the signal read out from the image sensor by the second actuation control, the controller controls to perform the first actuation control, and
in a case where the first actuation control is performed, the detector detects flicker based on an image read out from the image sensor.

3. The electronic apparatus according to claim 1, wherein, in a case where a resolution of an image to be read out from the image sensor is higher than a predetermined threshold, the determination unit determines that it is not possible to detect flicker based on the signal read out from the image sensor by the second actuation control.

4. The electronic apparatus according to claim 1, wherein, in a case where flicker is detected and a cycle of the flicker is equal to or less than a frame rate of an image read out from the image sensor, the controller sets the shooting conditions for the first pixel group so that a charge accumulation period of the image sensor is to be an integer multiple of the cycle of the flicker.

5. The electronic apparatus according to claim 1, wherein the at least one processor and/or circuitry further functions as a corrector that corrects influence of flicker in an image read out from the image sensor,
wherein in a case where flicker is detected and a cycle of the flicker is longer than a frame rate of an image read out from the image sensor, the detector detects a change in luminance within an image or between images based on an image read out from the image sensor by the first actuation control or a signal read out from the first pixel group by the second actuation control, and wherein the corrector applies a gain which is set to correct the change in luminance to the image.

6. The electronic apparatus according to claim 1, wherein the controller switches between the first actuation control and the second actuation control further in accordance with a state of power.

7. The electronic apparatus according to claim 6, wherein, in a case where a resolution of an image read out from the image sensor is higher than a predetermined threshold, the determination unit determines that it is not possible to detect flicker based on a signal read out from the image sensor by the second actuation control.

8. The electronic apparatus according to claim 6, wherein, in a case where a power saving priority setting which prioritizes reducing power consumption is set, the determination unit determines that it is not possible to detect flicker based on a signal read out from the image sensor by the second actuation control.

9. The electronic apparatus according to claim 6, wherein, in a case where the second actuation control is to be performed, if the state of power is a first state, the controller makes a frequency of actuating the second pixel group higher than a case where the state of power is a second state which is lower than the first state.

10. The electronic apparatus according to claim 9, wherein the controller controls to:
   in a case of a first power state in which power is supplied from outside, actuate the second pixel group at a first frequency in the second actuation control;
   in a case of a second power state in which power is not supplied from outside and the state of power is greater than a predetermined first threshold, actuate the second pixel group at a second frequency which is less frequent than the first frequency in the second actuation control;
   in a case of a third power state in which power is not supplied from outside and the state of power is equal to or less than the first threshold and greater than a second threshold which is smaller than the first threshold, actuate the second pixel group at a third frequency which is less frequent than the second frequency in the second actuation control; and
   in a case of a fourth power state in which power is not supplied from outside and the state of power is equal to or less than the second threshold, perform the first actuation control.

11. The electronic apparatus according to claim 10, wherein the detector
   detects flicker based on the detection signal in a case of the first power state and the second power state;
   detects flicker based on the detection signal and a signal read out from the first pixel group in a case of the third power state; and
   detects flicker based on a signal obtained by the first actuation control in a case of the fourth power state.

12. The electronic apparatus according to claim 1, wherein the controller controls the image sensor by the first actuation control or the second actuation control during a period since the electronic apparatus is turned on until it becomes ready to perform image shooting.

13. The electronic apparatus according to claim 1, wherein, in a case where still image shooting is instructed, the controller controls the image sensor by the first actuation control or the second actuation control before starting the still image shooting.

14. A control method of an electronic apparatus equipped with an image sensor having a plurality of pixels which are divided into a plurality of pixel groups including a first pixel group and a second pixel group, and capable of actuating each pixel group with shooting conditions independently set for each pixel group, the method comprising:
   controlling to switch between a first actuation control in which the first pixel group and the second pixel group are actuated with same shooting conditions and a second actuation control in which the first pixel group and the second pixel group are actuated with shooting conditions different from each other;
   detecting flicker based on a signal read out from the image sensor; and
   determining whether or not it is possible to detect flicker based on a signal read out from the image sensor by the second actuation control,
   wherein if it is determined that it is possible to detect flicker based on the signal read out from the image sensor by the second actuation control, it is controlled so that the second pixel group is actuated with the shooting conditions for flicker detection in the second actuation control, and that flicker is detected based on a detection signal read out from the second pixel group.

15. A non-transitory computer-readable storage medium, the storage medium storing a program that is executable by the computer, wherein the program includes program code for causing the computer to function as an electronic apparatus equipped with an image sensor having a plurality of pixels which are divided into a plurality of pixel groups including a first pixel group and a second pixel group, and capable of actuating each pixel group with shooting conditions independently set for each pixel group, comprising:
   a controller that switches between a first actuation control in which the first pixel group and the second pixel group are actuated with same shooting conditions and a second actuation control in which the first pixel group and the second pixel group are actuated with shooting conditions different from each other;
   a detector that detects flicker based on a signal read out from the image sensor; and
   a determination unit that determines whether or not the detector can detect flicker based on a signal read out from the image sensor by the second actuation control,
   wherein if the determination unit determines that it is possible to detect flicker based on the signal read out from the image sensor by the second actuation control, the controller controls to actuate the second pixel group with the shooting conditions for flicker detection in the second actuation control, and the detector detects flicker based on a detection signal read out from the second pixel group.

* * * * *